United States Patent [19]

Kijima et al.

[11] Patent Number: 4,526,400
[45] Date of Patent: Jul. 2, 1985

[54] VEHICLE REAR SUSPENSION MECHANISM

[75] Inventors: Takao Kijima; Jiro Maebayashi, both of Hiroshima, Japan

[73] Assignee: Mazda Motor Corporation, Hiroshima, Japan

[21] Appl. No.: 489,106

[22] Filed: Apr. 27, 1983

[30] Foreign Application Priority Data

Apr. 28, 1982 [JP] Japan .................. 57-71936
Apr. 28, 1982 [JP] Japan .................. 57-71937

[51] Int. Cl.³ .................... B60G 3/26; B60G 7/00
[52] U.S. Cl. .................. 280/701; 180/73.3; 267/20 R; 280/689; 280/690
[58] Field of Search .......... 280/701, 660–671, 280/673, 674, 675, 688, 690, 689; 267/20 R, 20 A, 57 R, 58; 180/73.3

[56] References Cited

U.S. PATENT DOCUMENTS

| | | | |
|---|---|---|---|
| 2,998,265 | 8/1961 | Kozicki | 267/20 R X |
| 4,143,887 | 3/1979 | Williams et al. | 267/57 R X |
| 4,415,178 | 11/1983 | Hatsushi et al. | 267/57 R X |
| 4,421,332 | 12/1983 | Kosak et al. | 280/701 X |
| 4,436,175 | 3/1984 | Watanabe et al. | 280/688 X |
| 4,440,419 | 4/1984 | Kosak et al. | 280/701 X |

FOREIGN PATENT DOCUMENTS 2158931 11/1971 Fed. Rep. of Germany .
2355954 11/1973 Fed. Rep. of Germany .
52-37649 9/1977 Japan .
1345859 11/1972 United Kingdom .

Primary Examiner—Joseph F. Peters, Jr.
Assistant Examiner—Mitchell J. Hill
Attorney, Agent, or Firm—Fleit, Jacobson, Cohn & Price

[57] ABSTRACT

A vehicle rear suspension mechanism capable of producing a toe-in displacement under a side force, a brake force, an engine brake force and an engine drive force to obtain a stabilized steering property. The mechanism includes a suspension member connected with a vehicle body, a wheel hub supporting a rear wheel for rotation about a rotating axis, a connecting device for connecting the wheel hub with the suspension member. The connecting device includes a ball joint connecting the wheel hub to the suspension member pivotably about the joint center, a first resilient bush located between the wheel hub and the suspension member in one of quadrants defined in a rectangular coordinate having an origin on the rotatable axis of the rear wheel other than the quadrant wherein the ball joint is located, a second resilient bush located between the wheel hub and the suspension member in one of the quadrants other than the quadrants wherein the ball joint and the first resilient bush are located.

11 Claims, 14 Drawing Figures

FIG.I(e)
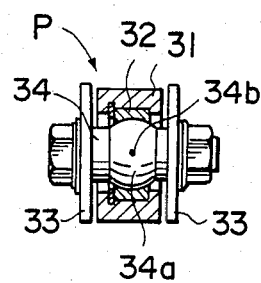
FIG.I(f)
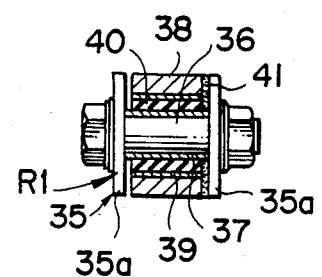
FIG.I(g)
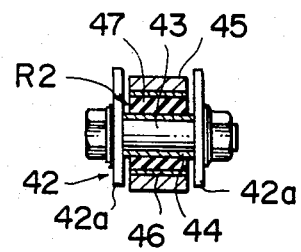
FIG.2
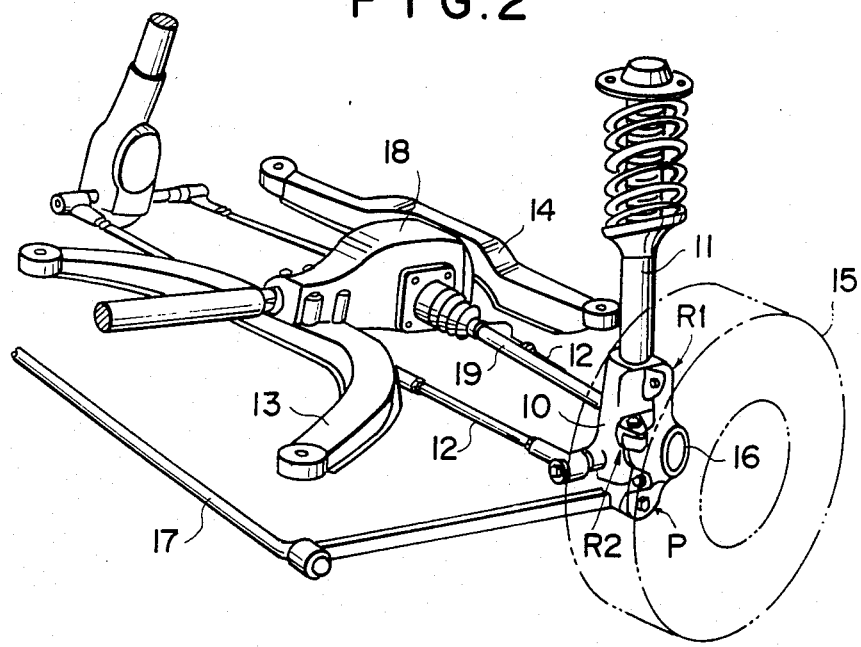

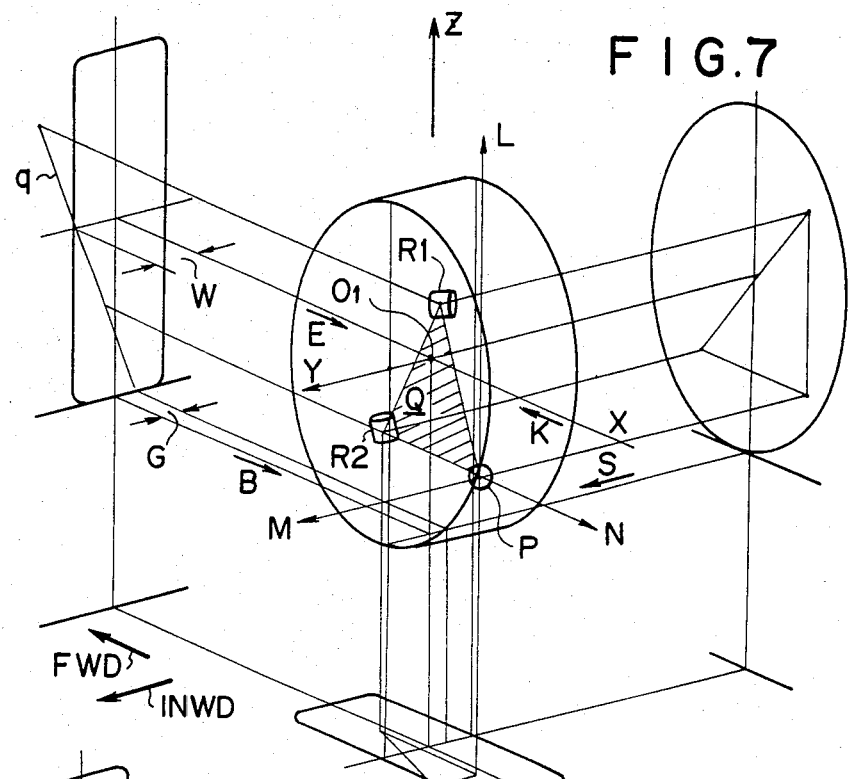
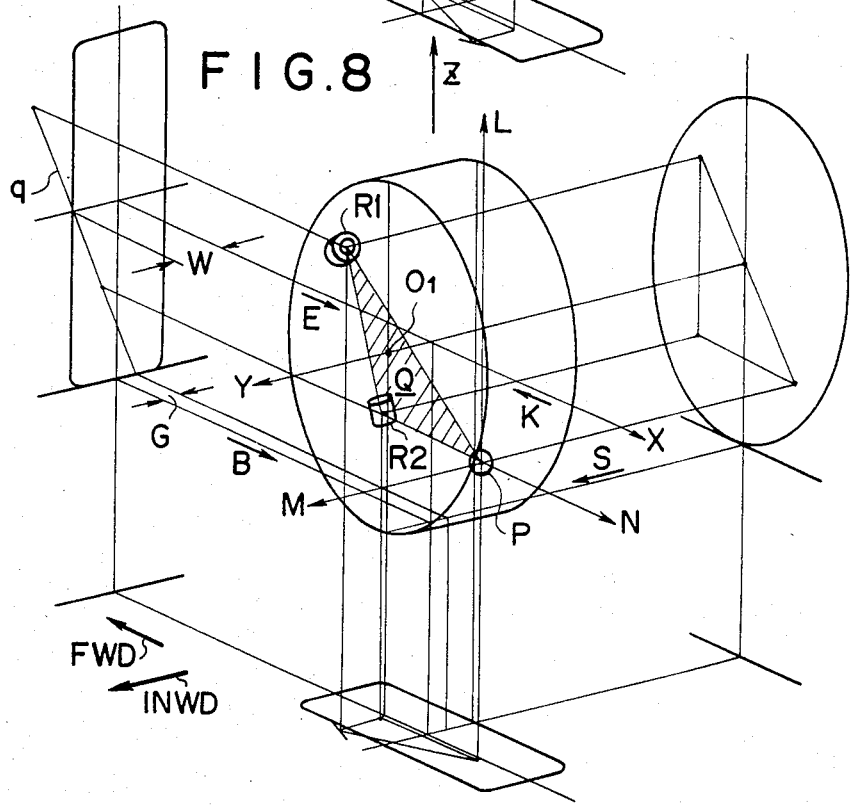

VEHICLE REAR SUSPENSION MECHANISM

CROSS-REFERENCE TO RELATED APPLICATIONS

The following are closely related copending U.S. patent applications:

| U.S. Ser. No. | Filing Date |
|---|---|
| 489,132 | April 27, 1983 |
| 489,492 | April 28, 1983 |
| 489,551 | April 28, 1983 |
| 498,433 | May 26, 1983 |
| 510,813 | July 5, 1983 |
| 513,028 | July 12, 1983 |

The present invention relates to vehicle suspension mechanisms and more particularly to vehicle rear suspension mechanisms. More specifically, the present invention pertains to a vehicle rear suspension mechanism in which a toe-in displacement is produced in an outboard rear wheel under a transversely inwardly directed side force.

In general, vehicle rear wheels are subjected, when the vehicle is running through a curved path, to a side force which is directed toward the center of curvature. In order to obtain a steering stability in an operation through a curved path, various propals have been made to make use of such side force to produce a toe-in displacement in a rear wheel, particularly, in an outboard rear wheel located outwards from the other wheel with respect to the center of curvature, so that an over steering can effectively be prevented. For example, German patent specification No. 2,158,931 discloses a vehicle rear suspension including a rear suspension arm having one end mounted on a vehicle body member for vertical swinging movements and the other end connected with a wheel hub which in turn carries a rear wheel for rotation about its own axis. The connection between the suspension arm and the wheel-hub is such that the wheel hub is connected to the arm by means of a vertically extending pivot pin which is located rearwards of the axis of the wheel and a spring is disposed forwardly of the wheel axis between the wheel hub and the suspension arm. Thus, when the wheel is subjected to an inwardly directed side force, the spring is deflected and a toe-in displacement is produced in the wheel about the joint pin. The German Pat. No. 2,355,954 proposes in this type of rear suspension mechanism to vary the spring force in accordance with the side force.

In Japanese patent publication No. 52-37649 corresponding to German patent application No. P 2200351.6 discloses a vehicle rear suspension including a rear suspension arm having one end swingably connected with a vehicle body member and the other end connected with a rear wheel hub. Between the suspension arm and the wheel hub, there are provided a pair of longitudinally spaced resilient members which can deflect in the transverse direction. The forward resilient member has a coefficient of resiliency which is smaller than that of the rearward resilient member so that a longer deflection is produced under a side force in the forward resilient member than in the rearward resilient member producing a toe-in displacement in the rear wheel. Further, there is described in the Japanese patent publication that a toe-in displacement of the rear wheel is also produced under a braking force by placing the center of displacement transversely outwardly of the central plane of the rear wheel.

It should however be noted that the aforementioned structures rely only to sideward deformations of springs or resilient members for producing the toe-in displacements so that the side force cannot effectively be utilized. Further, the structures are not designed to produce a toe-in displacement under a force transmitted through a drive axle such as a driving torque or an engine brake force. Moreover, the German patents do not deal with the subject matter of producing a toe-in displacement under a wheel braking force.

It is therefore an object of the present invention to provide a vehicle rear suspension mechanism in which a toe-in displacement can be produced in the rear wheel effectively under a side force acting on the wheel.

Another object of the present invention is to provide a vehicle rear suspension mechanism in which a rear wheel toe-in displacement can be produced not only under a side force but also under other forces applied to the rear wheel.

A further object of the present invention is to provide a vehicle rear suspension mechanism which can utilize the side force efficiently.

According to the present invention, the above and other objects can be accomplished by a vehicle rear suspension mechanism comprising a suspension member connected with a vehicle body, wheel hub means supporting a rear wheel having a wheel center plane for rotation about a rotating axis, connecting means for connecting said wheel hub means with said suspension member, said connecting means including ball joint means having a pivot center and connecting said wheel hub to said suspension member pivotably about the pivot center, first resilient means located between said wheel hub means and said suspension member in one of quadrants defined in a rectangular coordinate having an origin on said rotatable axis of said rear wheel other than the quadrant wherein the ball joint means is located, second resilient means located between said wheel hub means and said suspension member in one of the quadrants other than the quadrants wherein said ball joint means and said first resilient means are located. According to the features of the present invention, any displacement of the wheel hub means is made about the ball joint means so that a toe-in movement of the rear wheel can be produced with a minimum wheel displacement. Further, through the arrangement of the ball joint means and the two resilient means, it becomes possible to produce a toe-in movement in the rear wheel under various forces including a side force and other forces. The suspension member may be any type of member which is mounted on the vehicle body on one hand and connected with the wheel hub means on the other hand.

In order to ensure that the rear wheel be displaced to produce a toe-in movement under a side force, it is preferable that the ball joint means be located rearwards with respect to the rotating axis of the wheel. In order to produce a toe-in displacement under a braking force, the ball joint means and the first and second resilient means should be located so that a plane passing through the pivot center and centers of said first and second resilient means intersects a horizontal plane on ground level transversely outwardly of a center plane which is a vertical plane in the rear wheel passing through a wheel center on a vertical plane passing through the rotating axis of the rear wheel. Preferably, the plane passing through the pivot center and the centers of said first and second resilient means intersects a horizontal plane passing through the wheel center transversely inwardly of the center plane on the vertical plane passing through the rotating axis of the rear wheel. With this arrangement, it becomes possible to produce a toe-in displacement of the rear wheel under the engine brake force and the driving force.

The first and second resilient means may be in the form of rubber bushes having longitudinal axes and the ball joint means may be located at a rear lower portion with respect to the wheel rotating axis. The axis of the rubber bushes may be arranged so that a toe-in displacement is produced in the rear wheel when the wheel hub means is swung rearwardly or forwardly about the pivot point. This arrangement makes it possible to produce a toe-in movement under all of the side force, the braking force, the engine brake force and the wheel drive force.

The above and other objects and features will become apparent from the following descriptions of preferred embodiments taking reference to the accompanying drawings, in which:

FIG. 1b is vertical sectional view showing the connection between the suspension arm and the wheel hub in the right side rear suspension mechanism corresponding to the mechanism shown in FIG. 1a;

FIG. 1e is a sectional view showing a ball joint used in the mechanism shown in FIGS. 1a through 1d;

FIG. 1f is a sectional view showing the front rubber bush;

FIG. 1g is a sectional view showing the rear rubber bush;

FIG. 2 is a fragmentary perspective view of a rear suspension mechanism similar to FIG. 1a but showing another example;

FIGS. 5 through 8 are diagrammatical illustrations similar to FIG. 4 but showing other examples.

Figure 1A:
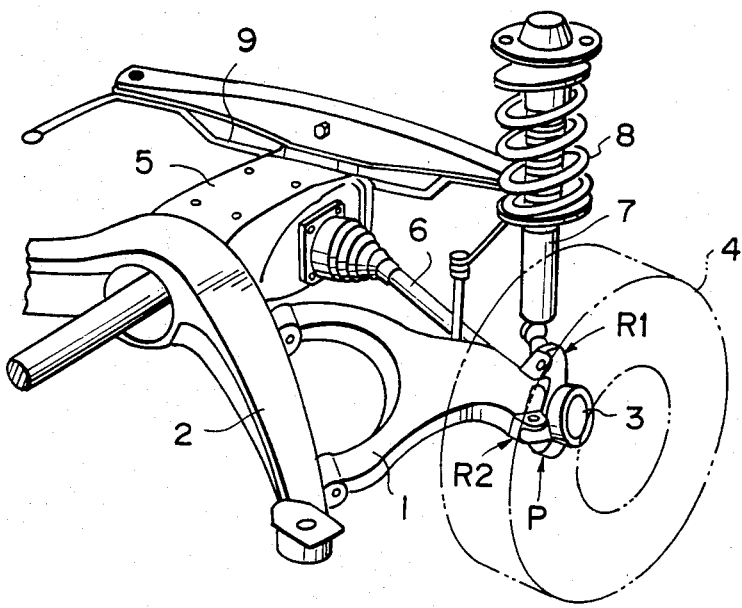
FIG. 1a is a fragmentary perspective view of a left side rear suspension mechanism in accordance with one embodiment of the present invention.

Referring now to the drawings, particularly to FIG. 1a there is shown a vehicle rear suspension mechanism of a semi-trailing arm type including a suspension arm 1 having a bifurcated front end portion connected for vertical swinging movement with a transversely extending sub-frame member 2 of a vehicle body which also carries a differential gear box 5. The rear end portion of the suspension arm 1 carries a wheel hub 3 which in turn carries a rear wheel 4 for rotation about a rotating axis. The rear wheel 4 is connected with a drive axle 6 which extends from the differential gear box 5 so as to be driven by an engine. Between the rear end portion of the suspension arm 1 and the vehicle body, there are provided a shock absorber 7 and a spring 8. A stabilizer 9 may be provided as well known in the art.

Figure 1B:
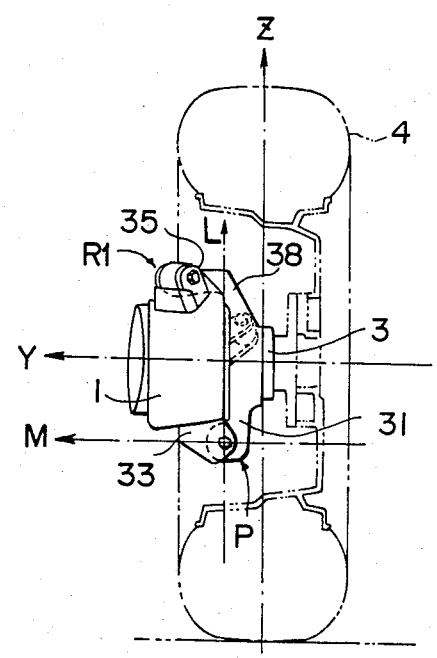
Figure 1C:
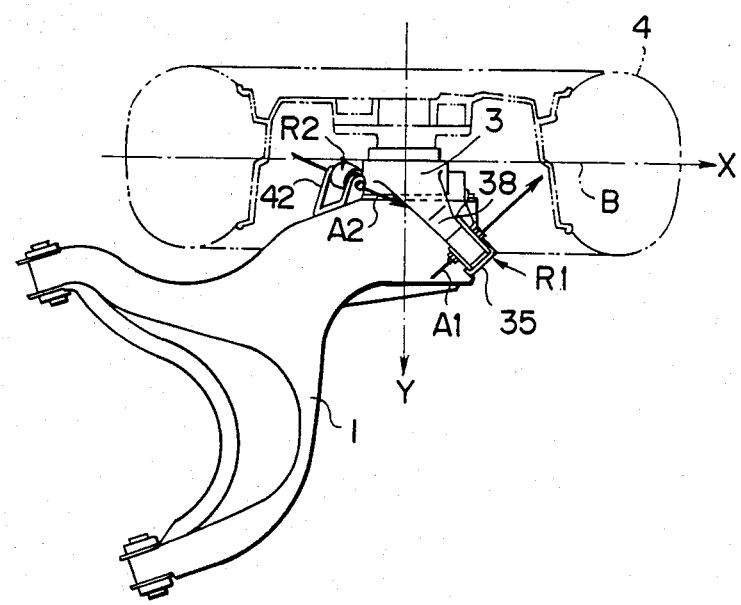
FIG. 1c is a plan view of the mechanism shown in FIG. 1b.
Figure 1D:
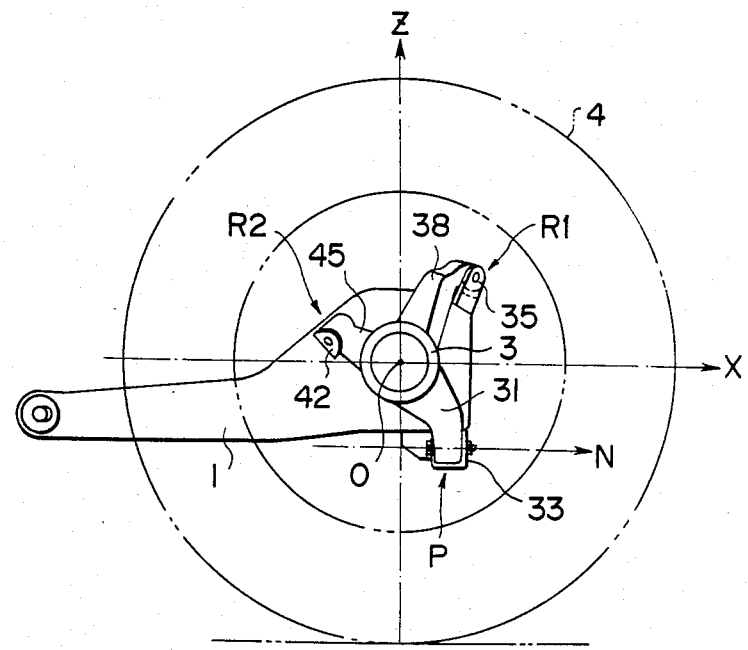
FIG. 1d is a side view as seen from the transverse inside.

As shown in FIGS. 1b, 1c and 1d, the wheel hub 3 is connected with the suspension arm 1 through a ball joint P and a pair of rubber bushes $R_1$ and $R_2$. Referring to FIG. 1d, it will be noted that the wheel hub 3 has a radially extending arm 31 which carries at the outer end a bearing metal block 32 having a part spherical recess as shown in FIG. 1e. The rear end portion of the suspension arm 1 is formed with a pair of lugs 33 which are located at the opposite sides of the outer end portion of the arm 31. A pin 34 having a part spherical portion 34a is inserted through the lugs 33 and the outer end portion of the radial arm 31 on the wheel hub 3 with the part spherical portion 34a seated in the part spherical recess in the bearing metal block 32 to constitute the ball joint P. Thus, the wheel hub 3 is swingable with respect to the suspension arm 1 about the center 34b of the part spherical portion 34a.

Referring to FIG. 1f which shows the rubber bush $R_1$ together with FIG. 1d, the wheel hub 3 has a radially extending arm 38 carrying the rubber bush $R_1$ which includes an inner tube 37, an outer tube 39 of a length shorter than the inner tube 37 and a resilient rubber 40 disposed between the inner and outer tubes 37 and 39. The suspension arm 1 is formed with a bracket 35 having a pair of lugs 35a. The outer tube 39 is secured to the arm 38 which is located between the lugs 35a and the inner tube 37 is held between the lugs 35a by means of a bolt 36. Between one axial end of the rubber bush $R_1$ and one of the lugs 35a, there is provided a stopper 41 of a relatively hard rubber so that the arm 38 is displaceable only in one axial direction.

Referring to FIG. 1g, it will be noted that the rubber bush $R_2$ is similar in structure and includes inner tube 44, an outer tube 46 and a resilient rubber 47. The outer tube 46 is secured to a radially extending arm 45 formed in the wheel hub 3 and the inner tube 44 is attached by means of a bolt 43 to a pair of lugs 42a formed in a bracket 42 provided on the suspension arm 1.

In the illustrated embodiment, the ball joint P is located rear and downwardly of the rotating axis O of the wheel 4. In other words, as seen from left side, it is located in the fourth quadrant of a rectangular coordinate defined by an abscissa X and an ordinate Z having an origine at the rotating axis O as shown in FIG. 1d. The rubber bush $R_1$ is in a rear and upward position with respect to the wheel rotating axis O, or in other words, in the first quadrant in the coordinate mentioned above. Further, the rubber bush $R_1$ is arranged with the stopper 41 located at the front side so that the forward displacement of the arm 38 and therefore the forward rotation of the wheel hub 3 are restricted. The rubber bush $R_2$ is located in a forward and upward portion with respect to the wheel rotating axis O, that is, in the second quadrant in the aforementioned coordinate.

As shown in FIG. 1c, the rubber bush $R_1$ is arranged in a plan view with its longitudinal axis $A_1$ inclined rearwardly and outwardly with respect to a center plane B of the rear wheel 4 and, as described previously, the arm 38 on the wheel hub 3 is displaceable in the direction shown by an arrow but is restricted to be displaced in the opposite direction due to the existence of the stopper 41. The rubber bush $R_2$ is arranged with its longitudinal axis $A_2$ inclined rearwardly and inwardly with respect to the center plane B of the rear wheel 4 and the arm 45 is displaceable along the axis $A_2$. The above arrangements are diagrammatically shown in FIG. 4.

Figure 4:
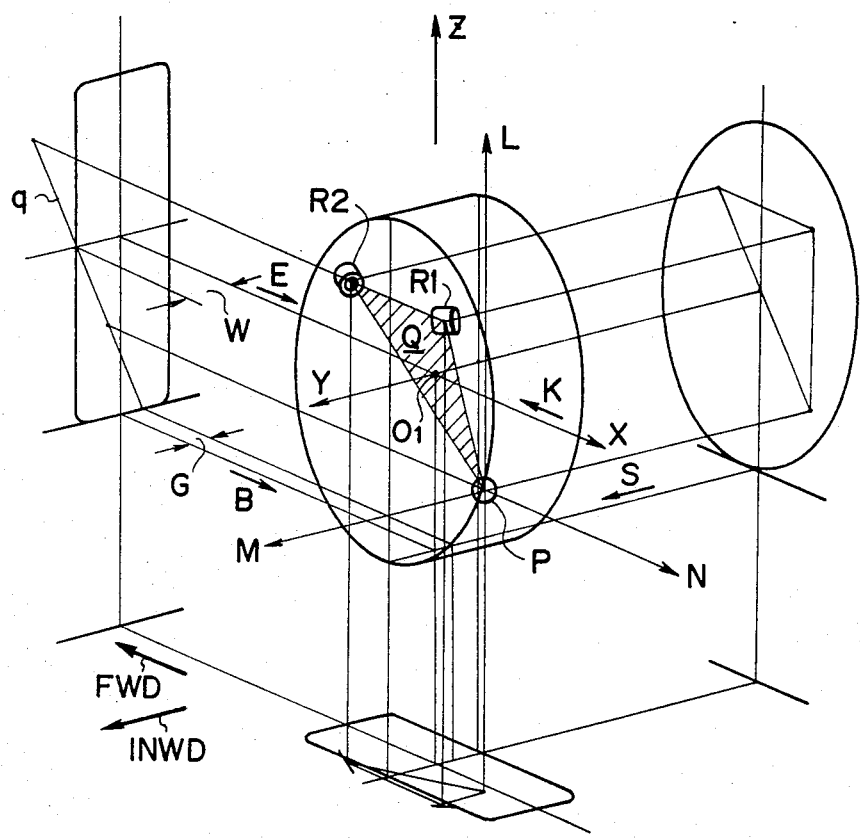
FIG. 4 is a diagrammatical illustration showing geometrical arrangements of the ball joint and the rubber bushes.

In FIG. 4, it will further be noted that a plane Q is defined by the center 34b of the ball joint P and centers of the rubber bushes $R_1$ and $R_2$, the centers of the rubber bushes being defines as the longitudinal centers on the longitudinal axes of the bushes. There is further defined a rectangular coordinate comprised of a longitudinal horizontal axis X, a vertical axis Z and a transverse horizontal axis Y intersecting with each other at the center $O_1$ of the rear wheel 4 which is defined at the intersection between the rotating axis and the center plane. In the illustrated arrangement, the plane Q intersects the YZ plane defining an imaginary line q which is transversely offset inwardly from the wheel center plane by a distance W at the level of the wheel center $O_1$ and outwardly from the wheel center plane by a distance G at the ground level.

With this arrangement, the following displacements are produced in the rear wheel 4. For the purpose of explanation, definition is made of a second rectangular coordinate including a vertical axis L, a transverse horizontal axis M and a longitudinal horizontal axis N having an origin at the center of the ball joint P.

(a) Behavior under a Side Force S

A side force S is applied when the vehicle is running through a curved path to an outboard rear wheel in the inward direction at the ground level. This side force S produces about the longitudinal axis N a moment which tends to incline the wheel outwardly and, since the ball joint P is rearwardly offset from the wheel center $O_1$, a further moment is produced about the vertical axis L to make the rubber bush $R_2$ deflect transversely inwardly. Thus, a toe-in displacement is produced in the rear wheel. The rubber bush $R_1$ is appropriately deflected in this instance depending on the location thereof.

(b) Behavior under a Braking Force B

The braking force B is applied rearwardly to the rear wheel 4 at the ground level. Since the plane Q is offset at the ground level transversely outwardly by the distance G, the rear wheel 4 is swung about the axis L under the braking force B so that the front portion of the wheel 4 is moved laterally inwardly. Thus, a toe-in displacement is produced in the rear wheel 4. At this instance, there is also produced about the transverse axis M a moment which tends the plane Q to rotate forwardly about the ball joint P. Due to the inclination of the axes $A_1$ and $A_2$ of the rubber bushes $R_1$ and $R_2$, the moment tends to deflect the rubber bush $R_1$ laterally inwardly and the rubber bush $R_2$ laterally outwardly possibly causing a toe-out movement. However, since the rubber bush $R_1$ has the aforementioned stopper 41, such lateral inward deflection is prevented and the toe-out trend can be overcome by the aforementioned toe-in trend.

(c) Behavior under an Engine Brake Force E

The engine brake force is applied rearwardly at the wheel center $O_1$ producing a rearward moment about the ball joint P. Since the longitudinal axes $A_1$ and $A_2$ of the rubber bushes $R_1$ and $R_2$ are inclined with respect to the wheel center plane B as previously described, the rubber bush $R_1$ is deformed outwardly under this moment as shown by the arrow in FIG. 1c, whereas the rubber bush $R_2$ is deformed inwardly. Thus, a toe-in movement is produced in the rear wheel 4.

(d) Behavior under a Driving Force K

The driving force K is applied forwardly to the rear wheel 4 at the wheel center $O_1$. Since the plane Q is offset inwardly from the wheel center plane at the level of the wheel center $O_1$, the force K produces a movement about the vertical axis L which tends to rotate the plane Q so that the forward portion thereof is moved inwardly. Thus, a toe-in movement is produced. In this instance, a trend of producing a toe-out movement may occur due to the inclinations of the longitudinal axes of the rubber bushes $R_1$ and $R_2$, however, since the rubber bush $R_1$ has the stopper 41, the trend is suppressed and overcome by the aforementioned trend of producing a toe-in movement.

In an alternative arrangement, the plane Q may be located so that the imaginary intersection line q is offset transversely inwardly at the ground level. In this arrangement, a toe-in movement can be produced under either of the side force S, the engine brake force E and the engine driving force K in a similar way as described in either of the above sub-paragraphs (a), (c) and (d). However, under a braking force B, the plane Q will be rotated outwardly about the ball joint P producing a toe-out movement in the wheel 4. However, this arrangement is very often satisfactory depending on the type of the vehicles.

In a further alternative arrangement wherein the plane Q is located so that the imaginary intersection line q is offset outwardly both at the level of the wheel center and the ground level, the rubber bushes $R_1$ and $R_2$ are arranged so that the longitudinal axis of the bush $R_1$ is inclined in the way opposite to that shown in FIGS. 1c and 4 whereas the longitudinal axis of the bush $R_2$ is inclined in the same way as shown in FIGS. 1c and 4. In this instance, the stopper 41 of the rubber bush $R_1$ is located at the rear end so that a rearward deflection of the bush is restricted. With this arrangement, it is possible to produce a toe-in movement under either of the side force S, the braking force B, the engine brake force E and the engine drive force K.

Figure 5:
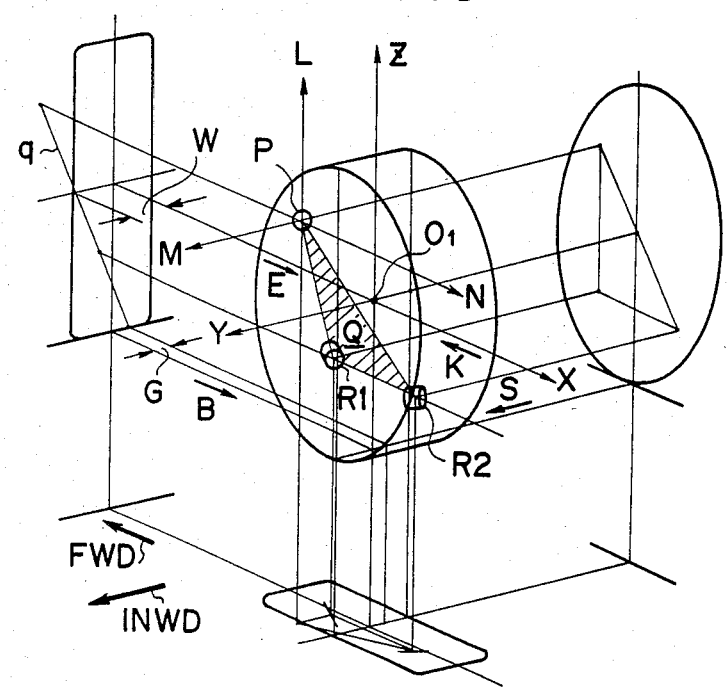

FIG. 5 shows another example of the connection between the suspension arm and the wheel hub. In this example, the ball joint P is located forwardly of and above the wheel center $O_1$, that is, in the second quadrant of the coordinate having the origin in the rotating axis of the wheel. The rubber bush $R_1$ is located forwardly of and below the wheel center $O_1$ whereas the rubber bush $R_2$ is rearwardly of and below the wheel center $O_1$. The plane Q is located so that the intersection line q is offset as in FIG. 4. The rubber bushes $R_1$ and $R_2$ are arranged so that the axis of the bush $R_1$ is inclined with respect to the wheel center plane forwardly and outwardly and the axis of the bush $R_2$ is inclined forwardly and inwardly.

With this arrangement, the following displacements are produced in the rear wheel 4.

(a-1) Behavior under a Side Force S

The plane Q is rotated about the ball joint P producing a rotation about the axis N. At this instance, if the coefficient of elasticity of each bush is so determined that the deflection at the bush $R_1$ is greater than the bush $R_2$, it is possible to produce a toe-in movement in the rear wheel 4.

(b-1) Behavior under a Braking Force B

The plane Q is rotated about the axes L and M so that a toe-in movement is produced.

(c-1) Behavior under an Engine Brake Force E

The plane Q is rotated rearwardly about the axis M causing a transverse inward deflection of the bush $R_1$ and a transverse outward deflection of the bush $R_2$ due to the inclinations of the longitudinal axes thereof. Thus, a toe-in movement is produced.

(d-1) Behavior under an Engine Drive Force

The plane Q is rotated about the axis L counterclockwise as seen in the top plan view due to the offset W to cause a toe-in movement. In this instance, it is preferable to provide the rubber bush $R_2$ with a stopper which restricts a transverse inward deflection thereof.

Where the plane Q is so arranged that the intersection line q is offset inwardly from the wheel center plane both at the level of the wheel center $O_1$ and the ground level, a toe-in movement is produced either under a side force S, an engine brake force E and an engine driving force K as in the sub-paragraphs a-1, c-1 and d-1. Under a braking force B, the plane Q is rotated about the axis M counterclockwise as seen from left side producing an inward deformation of the bush $R_1$ and an outward deformation of the bush $R_2$. As the result, a toe-in movement is produced in the wheel.

Where the arrangement is such that the intersection line q is offset outwardly at both the level of the wheel center $O_1$ and the ground level, a toe-in movement is produced under a side force S as in the sub-paragraph a-1. Under a braking force B and an engine brake force E, the plane Q is rotated about the axis L in the direction causing a toe-in movement. It is preferable to provide the rubber bush with a stopper at the rear end thereof to restrict its deflection. Under an engine driving force K, the plane Q is rotated about the axis M clockwise as seen from left. Due to the inclination of the axes of the bushes, a toe-in movement is produced.

Figure 6:
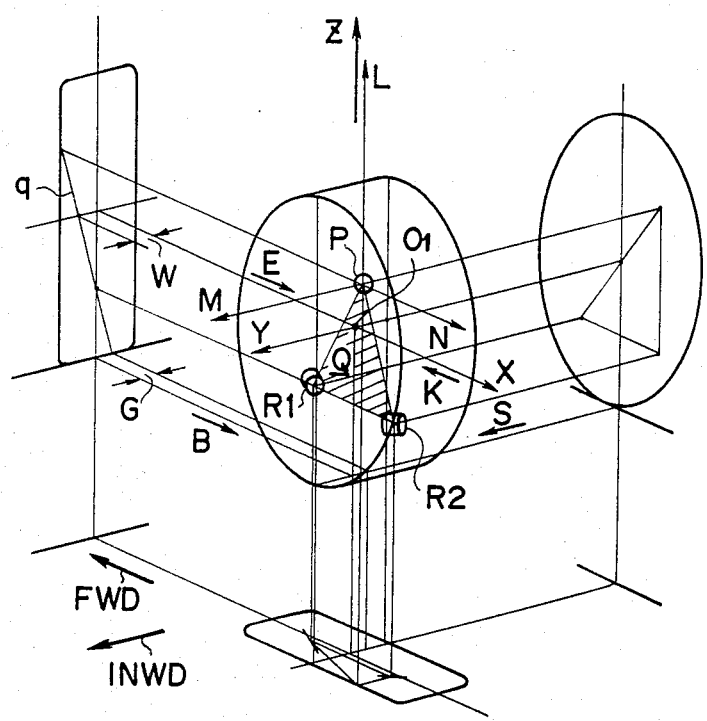

Referring to FIG. 6, there is shown a modification of the arrangement shown in FIG. 5. In this example, the ball joint P is located rearwardly of and above the wheel center $O_1$ but the arrangements are the same as in FIG. 5 in other respects. With this structure, the behavior of the rear wheel is as follows.

(a-2) Behavior under a Side Force S

The plane Q is rotated as in (a-1) to produce a toe-in movement. Since the ball joint P is rearwardly offset from the wheel center $O_1$, a movement is further produced about the axis L enhancing the toe-in movement.

(b-2) Behavior under a Braking Force B

The plane Q is rotated about the axes M and L causing a toe-in movement as in (b-1).

(c-2) Behavior under an Engine Brake Force E

The plane Q is rotated about the axis M counterclockwise as seen from left producing a toe-in movement as in (c-1).

(d-2) Behavior under an Engine Drive Force K

The plane Q is rotated about the axis L producing a toe-in movement as in (d-1). It is preferable to provide the bush $R_2$ with a stopper at the front end thereof.

Where the plane Q is arranged so that the intersection line q is offset inwardly both at the level of the wheel center $O_1$ and at the ground level, a toe-in movement is produced either under a side force S, an engine brake force E and an engine drive force K as in the sub-paragraphs (a-2), (b-2) and (c-2), respectively. Under a brake force B, the plane Q is rotated about the axis M counterclockwise as seen from left, so that it is possible to produce an inward deflection in the bush $R_1$ and an outward deflection in the bush $R_2$ by appropriately inclining the axes of the bushes to obtain a toe-in movement.

Where the intersection line q is outwardly offset both at the level of the wheel center $O_1$ and at the ground level, a toe-in movement is produced under a side force S as in (a-2). A toe-in movement is also produced under either of the braking force B, the engine brake force E and the engine drive force K as in the arrangement of FIG. 5.

FIG. 7 shows a modification of the arrangement in FIG. 4. In this modification, the rubber bush $R_2$ is located forwardly of and below the wheel center $O_1$. In this arrangement, the rear wheel is displaced as follows.

(a-3) Behavior under a Side Force S

The plane Q is inwardly rotated about the ball joint P and since the ball joint P is rearwards of the wheel center $O_1$, a toe-in movement is produced in the rear wheel.

(b-3) Behavior under a Brake Force B

The plane Q is rotated about the ball joint P producing a rotation about the axis L. Thus, a toe-in movement is produced. It is preferable to provide a stopper at the front end of the rubber bush $R_1$.

(c-3) Behavior under an Engine Brake Force E

The plane Q is rotated about the axis M. Due to the inclination of the longitudinal axes of the bushes $R_1$ and $R_2$ with respect to the wheel center plane, it is possible to produce a toe-in movement in the wheel.

(d-3) Behavior under an Engine Drive Force K

The plane Q is rotated about the axis L producing a toe-in movement. It is preferable to provide a stopper at the front end of the bush $R_1$.

Where the arrangement is such that the intersection line q is offset inwardly both at the level of the wheel center $O_1$ and the ground level, a toe-in movement is produced as in (a-3). Under an engine brake force E, the plane Q is rotated about the axes M and L to produce a toe-in movement. Under an engine driving force K, the plane Q is also rotated about the axes M and L to produce a toe-in movement. At this instance, however, it is preferable to provide a stopper at the front end of the bush $R_1$. Under a brake force B, the plane Q is rotated about the axis L in the direction wherein a toe-out movement is produced. However, this arrangement is satisfactory in various applications.

Where the intersection line q is offset outwardly both at the level of the wheel center $O_1$ and the ground level, the bush $R_1$ is arranged with its axis inclined rearwardly and inwardly with respect to a wheel center plane. Then, a toe-in movement can be obtained under a side force S as in (a-3) and under a brake force B by having the plane Q rotated about the axes M and L. Under the engine brake force E, the plane Q is rotated about the axis L counterclockwise as seen from top causing a toe-in movement. It is preferable to provide a stopper at the rear end of the bush $R_1$. Under the engine driving force K, the plane Q is rotated about the axis M counterclockwise as seen from left. By appropriately determining the inclination of the axis of each bush, it is possible to produce a toe-in movement.

FIG. 8 shows a modification of the arrangement in FIG. 7. In this modification, the rubber bush $R_1$ is located forwardly of and above the wheel center $O_1$. Following movements are produced in the rear wheel.

(a-4) Behavior under a Side Force S

The plane Q is rotated about the axis L counterclockwise as seen from top producing a toe-in movement.

(b-4) Behavior under a Brake Force B

The plane Q is rotated about the axis L counterclockwise as seen from top to produce a toe-in movement. It is preferable to provide a stopper at the front end of the rubber bush $R_1$ to restrict a forward deflection thereof.

(c-4) Behavior under an Engine Brake Force E

The plane Q is rotated about the axis M. By properly determining the inclination of the axis of each bush with respect to the wheel center plane, it is possible to obtain a toe-in movement.

(d-4) Behavior under an Engine Drive Force K

The plane Q is rotated about the axis L to produce a toe-in movement. It is preferable to provide a stopper at the front end of the bush $R_1$.

Where the arrangement is such that the intersection line q is offset inwardly from the wheel center $O_1$ both at the level of the wheel center $O_1$ and the ground level, a toe-in movement is produced either under a side force S, an engine brake force E and an engine drive force K as in (a-3), (c-3) and (d-3). Under a brake force B, the plane Q is rotated about the axis L to produce a toe-out movement. However, this arrangement is satisfactory in various applications.

Where the intersection line q is offset outwardly from the wheel center $O_1$ both at the level of the wheel center $O_1$ and the ground level, the bush $R_1$ is arranged so that the axis thereof is inclined with respect to the wheel center plane rearwardly and outwardly. Under the side force S, a toe-in movement is produced as in (a-4). Under a brake force B, the plane Q is rotated about the axes M and L to produce a toe-in movement. The plane Q is rotated under the engine brake force E, about the axis L and, under the engine drive force K, about the axis M, respectively producing toe-in movements.

Referring to FIG. 2, there is shown another example of a vehicle rear suspension which includes a strut hub 10 to which a suspension strut assembly 11 is secured at its lower end. The strut hub 10 is connected through a pair of transverse links 12 with sub-frames 13 and 14 of a vehicle body which also carry a differential gear box 18. A stabilizer 17 may be provided as well known in the art. A wheel hub 16 carries a rear wheel 15 for rotation about a rotating axis. In this type of suspension mechanism, the wheel hub 16 is connected with the strut hub 10 through a ball joint P and a pair of rubber bushes $R_1$ and $R_2$ which are arranged in anyone of the manners described previously. A drive axle 19 extends from the differential gear box 18 to drive the wheel 15.

Figure 3:
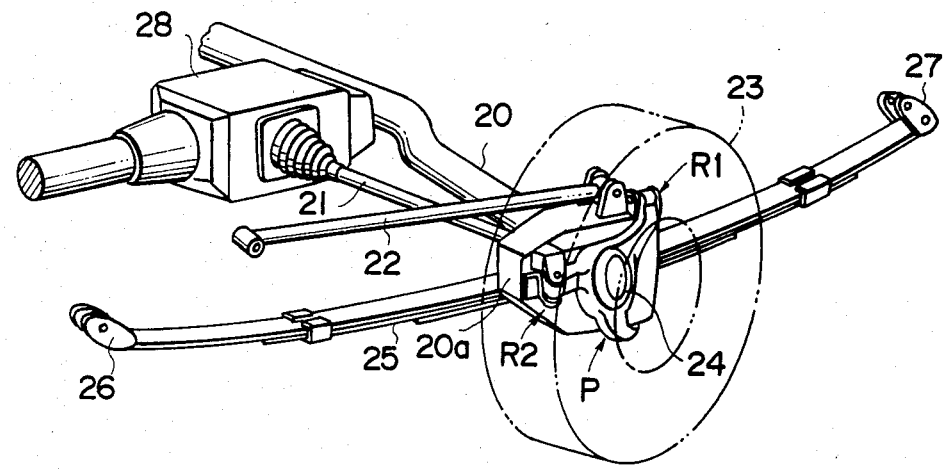
FIG. 3 is a fragmentary perspective view showing a further example.

FIG. 3 shows a further example of a vehicle rear suspension mechanism which includes a transversely extending pipe 20 having a wheel support bracket 20a at each end. The bracket 20a is suspended by a leaf spring assembly 25 which are attached to the vehicle body (not shown) through fittings 26 and 27. A differential gear box 28 is provided and has a drive axle 21 to drive a rear wheel 23. The bracket 20a is also connected through a tension rod 22 with the vehicle body. The rear wheel 23 is rotatably carried by a wheel hub 24 which is connected with the bracket 20a through a ball joint P and a pair of rubber bushes $R_1$ and $R_2$ arranged in any of the manners described previously.

The invention has thus been shown and described with reference to specific embodiments, however, it should be noted that the invention is in no way limited to the details of the illustrated arrangements but changes and modifications may be made without departing from the scope of the appended claims.

We claim:

1. A vehicle rear suspension mechanism comprising a suspension member connected with a vehicle body, wheel hub means supporting a rear wheel having a wheel center plane for rotation about a rotating axis, connecting means for connecting said wheel hub means with said suspension member, said connecting means including ball joint means having a pivot center and connecting said wheel hub to said suspension member pivotably about the pivot center, first resilient means located between said wheel hub means and said suspension member in one of quadrants defined in a rectangular coordinate having an origin on said rotatable axis of said rear wheel other than the quadrant wherein the ball joint means is located, second resilient means located between said wheel hub means and said suspension member in one of the quadrants other than the quadrants wherein said ball joint means and said first resilient means are located.

2. A vehicle rear suspension mechanism in accordance with claim 1 in which said ball joint means is located rearwardly of the rotating axis of the wheel.

3. A vehicle rear suspension mechanism in accordance with claim 1 in which a plane containing the pivot center of the ball joint means and centers of said first and second resilient means has an intersection with a vertical plane containing said rotating axis to define an intersection line which is offset at ground level transversely outwardly of said wheel center plane.

4. A vehicle rear suspension mechanism in accordance with claim 3 in which said intersection line is offset transversely inwardly at the level of the rotating axis.

5. A vehicle rear suspension mechanism in accordance with claim 3 in which said intersection line is offset transversely outwardly at the level of the rotating axis.

6. A vehicle rear suspension mechanism in accordance with claim 4 in which said ball joint means is located rearwardly of and below the rotating axis, said first and second resilient means having axes of deflection which are arranged so that they permit a rearward rotation of said hub means with respect to said suspension member and through such rearward rotation of the hub means a toe-in movement of said rear wheel is produced.

7. A vehicle rear suspension mechanism in accordance with claim 5 in which said ball joint means is located rearwardly of and below the rotating axis, said first and second resilient means having axes of deflection which are arranged so that they permit a forward rotation of said hub means with respect to said suspension member and through such forward rotation of said hub means a toe-in movement of said rear wheel is produced.

8. A vehicle rear suspension mechanism comprising:
a suspension member connected with a vehicle body;
wheel hub means supporting a rear wheel having a wheel center plane for rotation about a rotating axis; and
connecting means for connecting said wheel hub means with said suspension member, said connecting means including ball joint means having a pivot center located rearwardly of and below the rotating axis of the rear wheel and connecting said wheel hub to said suspension member pivotably about the pivot center, first resilient means located between said wheel hub means and said suspension member rearwardly of and above the rotating axis of the rear wheel, and second resilient means located between said wheel hub means and said suspension member forwardly of and below the rotating axis of the rear wheel.

9. The vehicle rear suspension mechanism in accordance with claim 8 wherein a plane defined by the pivot center of the ball joint means and centers of said first and second resilient means has an intersection with a vertical plane containing said rotating axis to define an intersection line which is offset at ground level transversely outwardly of said wheel center plane.

10. The vehicle rear suspension mechanism in accordance with claim 9, wherein said intersection line is offset transversely inwardly at the level of the rotating axis.

11. A vehicle rear suspension mechanism comprising:
a suspension member connected with a vehicle body;
wheel hub means supporting a rear wheel having a wheel center plane for rotation about a rotating axis; and
connecting means for connecting said wheel hub means with said suspension member, said connecting means including ball joint means having a pivot center located rearwardly of and below the rotating axis of the rear wheel and connecting said wheel hub to said suspension member pivotably about the pivot center, first resilient means located between said wheel hub means and said suspension member forwardly of and above the rotating axis of the rear wheel, and second resilient means located between said wheel hub means and said suspension member forwardly of and below the rotating axis of the rear wheel.

* * * * *